United States Patent [19]

Kaplan

[11] Patent Number: 5,522,728
[45] Date of Patent: Jun. 4, 1996

[54] BRAILLE SLOT MACHINE

[76] Inventor: Edward B. Kaplan, 45 S. New York Rd., Building #202-A, Ste. 200, Absecon, N.J. 08201

[21] Appl. No.: 408,241

[22] Filed: Mar. 22, 1995

Related U.S. Application Data

[62] Division of Ser. No. 308,858, Sep. 19, 1994, Pat. No. 5,429,507.

[51] Int. Cl.⁶ .................................................. G09B 21/02
[52] U.S. Cl. ........................ 434/112; 434/113; 434/114; 434/117
[58] Field of Search ............................ 434/112–115, 117

[56] References Cited

U.S. PATENT DOCUMENTS

| | | | |
|---|---|---|---|
| 3,659,354 | 5/1972 | Sutherland | 434/113 |
| 4,633,121 | 12/1986 | Ogawa et al. | 434/114 X |
| 4,664,632 | 5/1987 | Tretiakoff et al. | 434/114 |
| 4,752,772 | 6/1988 | Litt et al. | 434/114 X |
| 4,758,165 | 7/1988 | Tieman et al. | 434/114 |

*Primary Examiner*—Richard J. Apley
*Assistant Examiner*—Glenn E. Richman
*Attorney, Agent, or Firm*—Edwin E. Greigg; Ronald E. Greigg

[57] ABSTRACT

The present invention will utilize refreshing braille pins to form the symbols displayed on a slot machine. The braille pins will move vertically and independent of each other. A read only memory (ROM) will send the information to the braille pin cluster that will form the braille symbol. At this time of conception of the invention, the play of the slot machine will utilize one coin per play.

6 Claims, 6 Drawing Sheets

FIG. 2
| 1 | 2 | 3 |
|---|---|---|
| 4 | 5 | 6 |
| 7 | 8 | 9 |
FIG. 3a
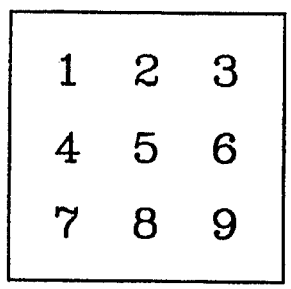
FIG. 3b
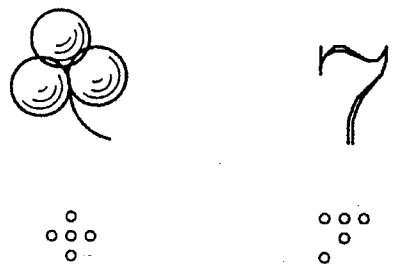
FIG. 3c
1 BAR
FIG. 3d
2 BAR
FIG. 3e
3 BAR
 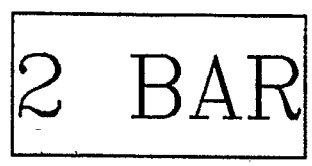 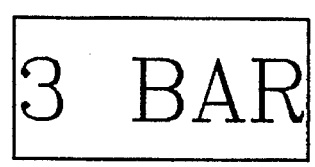
FIG. 6
UP COIL (5) 
MAGNET (3) 
FIG. 7
DOWN COIL (6) 
MAGNET (3) 

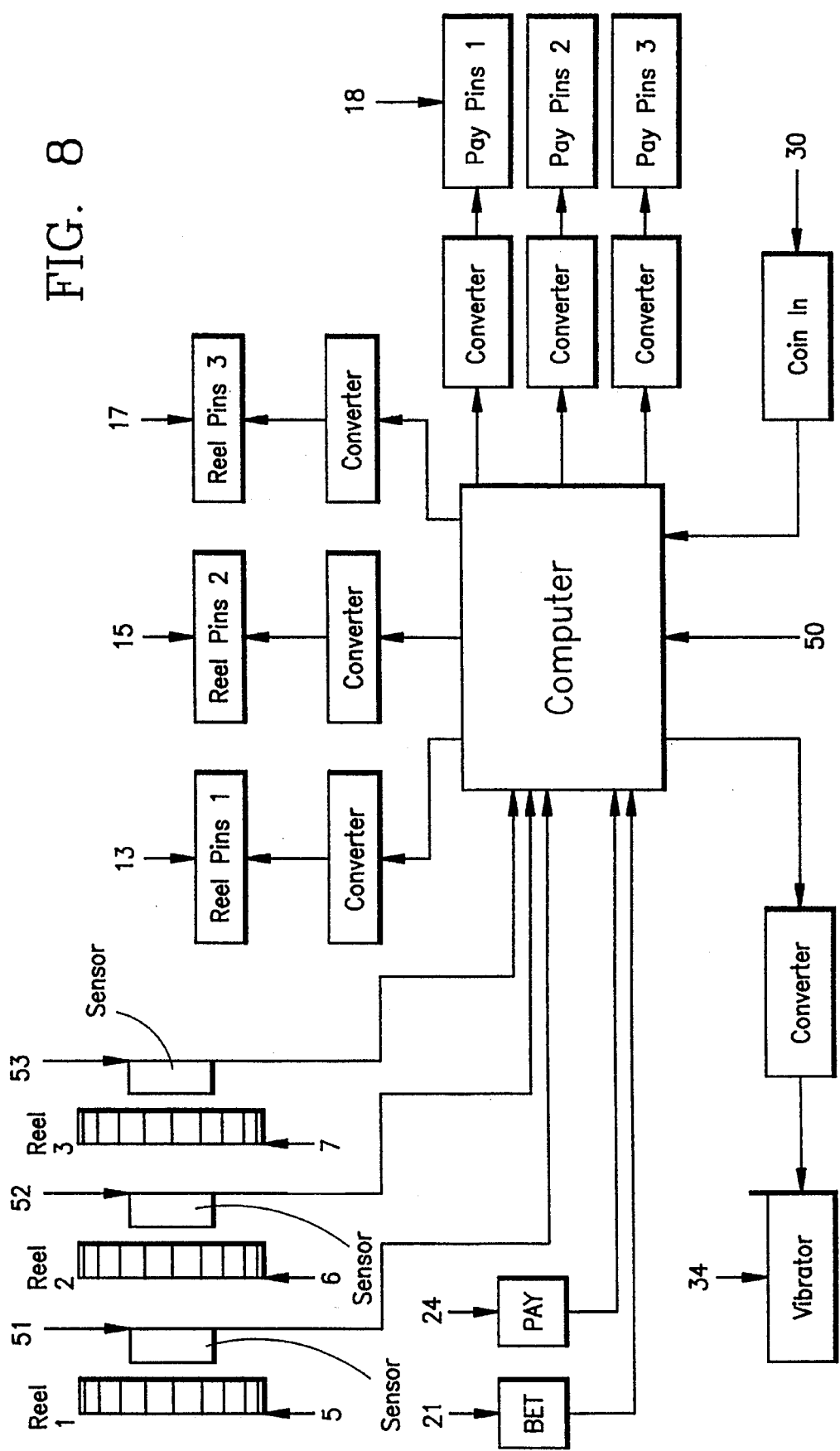

FIG. 9

BRAILLE SLOT MACHINE

This is a divisional of copending application Ser. No. 08/308,858 filed on Sep. 19, 1994, now U.S. Pat. No. 5,429,507.

BACKGROUND OF THE INVENTION

This invention is directed to either an electro-mechanical or video slot machine game more particularly for blind and/or visually impaired persons.

Heretofore slot machines and other game machines have been made for persons who could see the operation of the machine. Thus, the operator could see the reels rotate and could see if a pay-out has been indicated by the rest position of the reels.

It is therefore an object to make a slot machine which can be enjoyed by blind or visually impaired persons so that such persons can enjoy the excitement of a slot machine operation and pay-out of a winning play.

Another object is to provide braille pads for each rotatable reel in which each pad is provided with vertically movable pins which can be felt with ones fingers so that as the reel rotates the operator can sense the characters represented on the reels by the pin arrangement in the pads. Further, the visually impaired operator can feel the pads to sense the characters shown on the reels viewed visually by other persons during rotating of the reels and at a rest position of the reels.

Still another object is to provide a braille pad which will indicate the number of coins for any winnings by operation of the machine.

In carrying out the invention, a regular made slot machine is converted so that the electro-mechanical or video slot machine game will interact with refreshing braille pins coinciding with the symbols per reels of the slot machine. Symbols displayed on the pay line will be updated to the braille pins on the slot machine. A cluster of at least nine (9) individual refreshing braille pins will form a braille pad. The refreshing braille pins will move independently of each other in a vertical motion direction and lock in the up position by an electromagnet or any other means for locking the braille pins in an opposition to form the symbols displayed on the pay line of the slot machine in a specified graphic braille. There will be one (1) braille pad for each reel of the slot machine. There will be at least three (3) braille pads for each slot machine having at least three reels. When the reels spin in the slot machine, the pins on the braille pad, for each reel, will vertically move so the symbol moving across the pay line of each reel for each braille pin pad will be sensed and introduce the feeling of the rotation of the reels in motion. The reels of the slot machines will stop independently of each other and the symbols displayed on the pay line will be graphically formed on the individual braille pin pad of the respective reel. If the specified win combination occurs, the slot machine will vibrate slightly or in some other manner indicate a win. All wins will be credited to the slot machine for the benefit of the visually impaired person. This will also deter any theft from any other individuals. When the play is finished, the player will then press a pay-out button to retrieve all coins from the machine and all pins of each braille pad will return to a rest position which does not correspond to any type of character.

BRIEF DESCRIPTION OF THE DRAWINGS

FIG. 2 represents a top view of a braille pad illustrating the position of nine separate pin locations;

FIGS. 3a–3e set forth some possible visual characters for displaying on the reels and their corresponding braille pin arrangement which can be felt by the visually impaired;

FIG. 6 illustrates a timing signal for controlling a pin from a down position to an up position for each separate pin;

FIG. 7 illustrates a timing signal for controlling a pin from an up position to a down position for each separate pin;

FIG. 8 illustrates a schematic of an electronic control system for a braille slot machine; and FIG. 9 illustrates braille pin positions for each letter of the alphabet and pin positions for a braille representation for the term "number".

DETAILED DESCRIPTION

Figure 1:
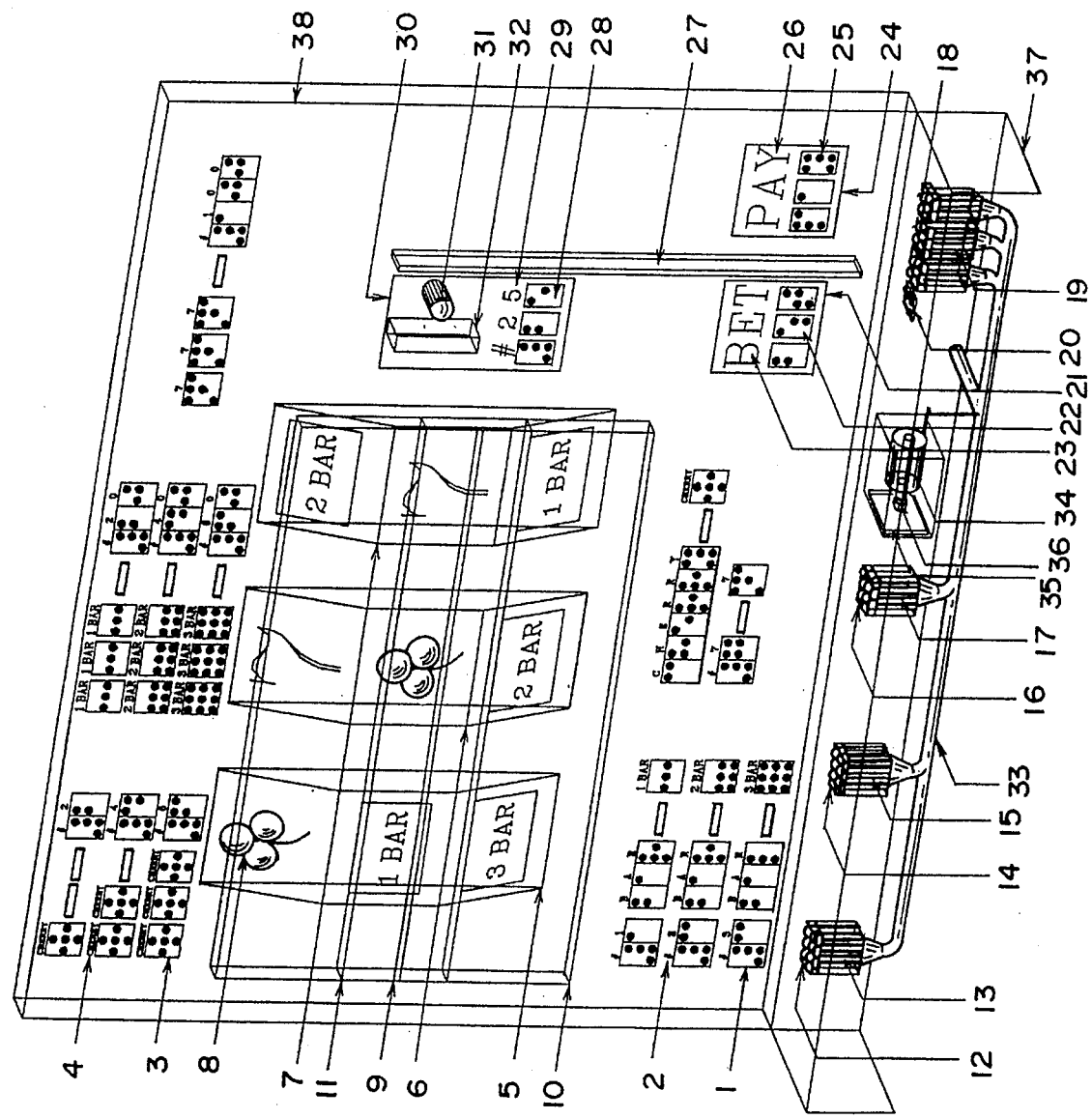
FIG. 1 illustrates a schematic of a front face of a slot machine including the braille symbols, reels, controls and pay-out amounts for winning positions of the reels.

Now referring to FIG. 1 there is shown near the left side bottom of the face permanent raised imprint visual symbols and the braille pin position for each of the symbols formed by raised imprints corresponding to numbers, letters and a symbol for a bar. The raised imprints can be felt by the visually impaired to gain a feel for the pin display of a pin pad. As illustrated there are shown the numbers 1–3, the word BAR, a bar symbol and the raised imprints for the braille pin positions for each of these which can be sensed by a visually impaired person touching the braille pin positions. As illustrated, the symbol for "number" is to the left and then a raised braille imprint is to the right which depicts the number. The numbers are formulated by the symbol "number" and then for numbers 1–10 the raised imprints for the letters a–j represent in order 1–9 where j represents zero. That is, the numbers are prefaced by the symbol for number followed by the symbols for a–j to represent the numbers. In the middle bottom the word CHERRY is spelled and illustrated by raised imprints which represent the pin positions for the symbol cherry. Below the word cherry, a character for number and the number 7 is shown along with the braille pin position for "number" and for the number 7. Above the visual and braille symbols 1, 2, three reels 5, 6, 7 of the slot machine are illustrated as shown, three symbols 8 are shown on each reel with the center symbols representing symbols 8 on a pay-out line for one play of the slot machine. Each of the reels shown are visible through windows which cover the reels. Above the three reels are shown the various pay-out positions represented by the reference character 4 which can be seen visually and braille pin positions 3 for each of the visual terms such as "cherry". Alongside each horizontal row in the 4th vertical row is a visual number and raised imprints for braille pin positions for each number which represents the number of coins won for each of the pay-out symbols. In the middle top of the face there is shown pay-out amounts for three symbols indicated and shown, that is: aligned one bar, two bar and three bars. On the right top is shown the jackpot shown by three aligned sevens (7) with the number 100 of coins won. The win symbols enable both a sighted person and a visually impaired person to view and feel the symbols and winning amounts for the win symbols. As illustrated herein each of the reels have symbols representing a cherry, one bar, two bars, three bars and a seven. These are spaced on the reel such as in a regular slot machine and pay-out winning amounts indicated, if aligned as shown across the upper face of the slot machine.

The very bottom of the face shown in FIG. 1 includes braille pin pads 12, 14 and 16, one pad for each of the reels 5, 6 and 7, respectively. Each of the pin pads include at least nine pins which are positioned in three rows of three which are represented in FIG. 2 which illustrates a top view of the pin positions. The braille pads 12, 14, 16 each include the nine pins 13, 15 and 17 respectively and the pads 12, 14 and 16 represent symbols shown on the pay line for the three reels 5, 6, and 7, respectively. A visually impaired person can feel each of the braille pads to sense the symbol represented in the window of each reel along the pay line. The nine pins of each braille pad 12, 14, 16 are operated separately or by any other means electronically to raise and lower each separate pin in each separate braille pad as the symbols on the rotating reels pass the pay line. Therefore, each braille pad 12, 14 and 16 will indicate the symbols for each reel as the reel spins and when the reels stop spinning and are at rest. The symbols on each of the reels are the same except the arrangement of symbols on the circumference of each reel is different. As shown in FIGS. 3a–3e, the symbols are CHERRY, 7, 1 BAR, 2 BAR and 3 BAR. Each of these symbols will be formed by pins arranged in the following order:

The Cherry (3a):
The cherry will use the pins (2,4,5,6,8);
The Seven (3b):
The seven will use the pins (1,2,3,5,7);
The 1 Bar (3c):
The 1 bar will use the pins (4,5,6);
The 2 Bar (3d):
The 2 bar will use the pins (4,5,6,7,8,9);
The 3 Bar (3e):
The 3 bar will use the pins (1,2,3,4,5,6,7,8,9).

Each of the braille pads can be felt by a visually impaired person so that the visually impaired person can sense a feel of pin representation of the different symbols on the pay line as the reels rotate. At first the reels will rotate very fast and it may be hard to determine every symbol; however, as the reels slow down the symbols can be more readily sensed by feel or will be felt when the reel comes to a complete stop to reveal the symbol on the pay line. Just to the right of the innermost braille pad 16 there is shown a solenoid 34 which is activated when a win payout is shown. The solenoid includes a rod 36 which bumps a bumper pad 35 to cause a vibration which is sensed by the operator to register a winning combination. Any other type of device may be used to indicate a win. To the far right bottom there is shown braille pads 18 which include braille pins 19 that indicate numbers of coins represented in the win display which can be activated by the player at any time to receive the coins in the win box. A raised braille imprint which represents "number" is shown to the left of the braille pads 18. Since the symbol for number is indicated on the left, the visually impaired will know that the raised pins to the right of "number" will indicate the number of coins in the machine available to be played or collected by the operator. Just above the braille pads 18 there is shown on the left of a separation bar 27, a visual term BET 23 and the raised imprint for the braille pin representation 22 of the term BET which can be felt by the visually impaired. This is pushed by a person in order to start play of the slot machine. To the right of the BET button there is shown a visual imprint PAY 26 with the raised imprint for the braille pin representation 25 shown for each of the letters PAY. This is pushed to order the machine to pay-out any winnings which is represented by the braille pin pads 18. Above the BET indicator 23 there is found a coin slot 32, a coin return button 31 and a visual representation 29 of the money denomination to be played, and below that, the braille indication 28 of the type of coin to be deposited for operation of the machine. As shown, the braille pin representation shows #25 to indicate that 25 cents is to be deposited. Any other denomination for operating the machine may be indicated. Not shown, is the receiver for the coins won in which the winnings are deposited by pushing the PAY button.

Figure 4:
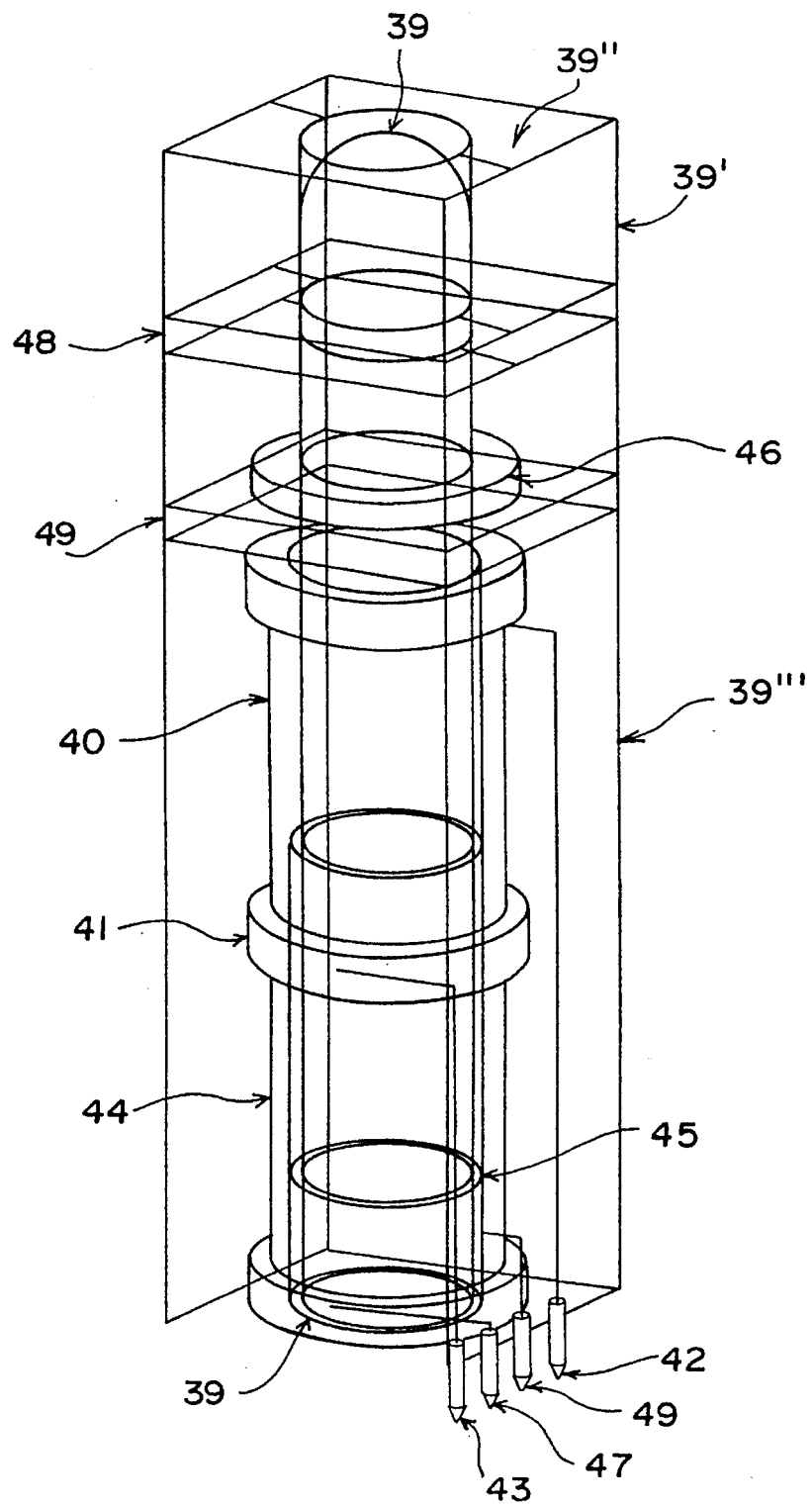
FIG. 4 illustrates a single braille pin with the operative features.
Figure 5:
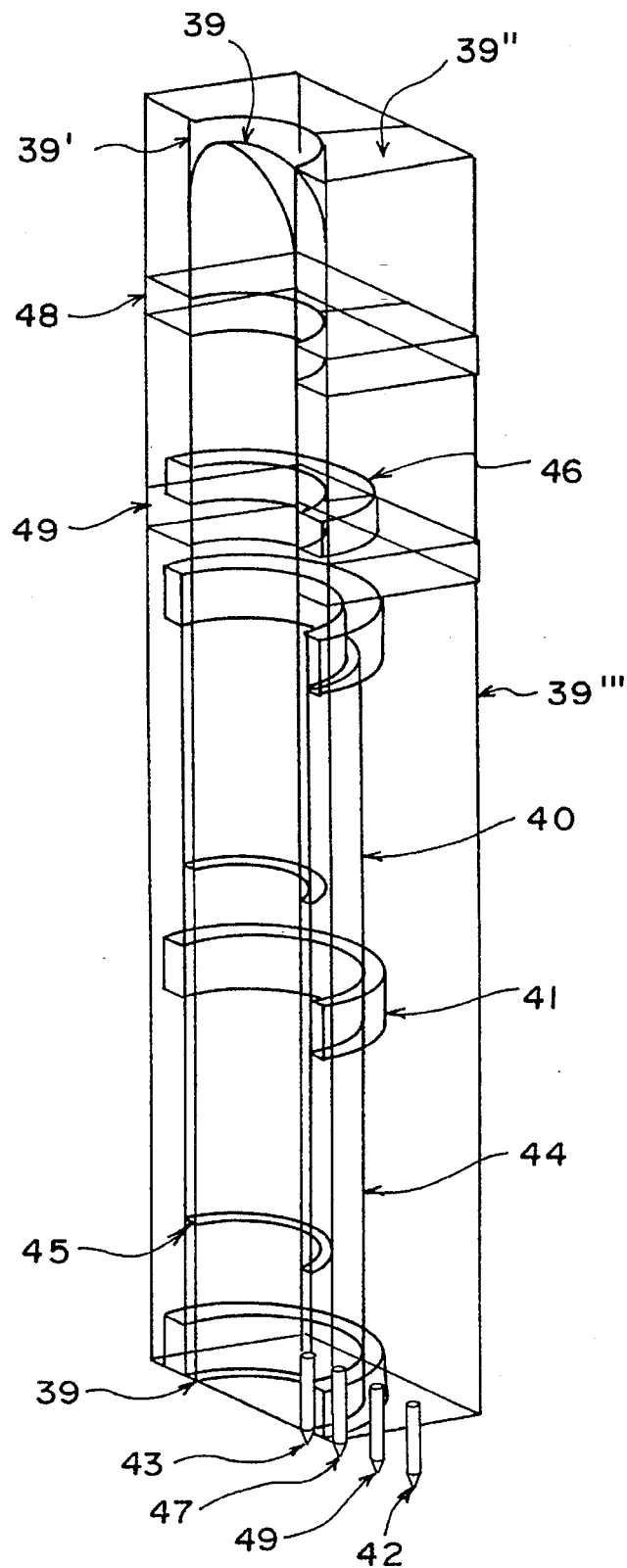
FIG. 5 illustrates a cross sectional view of the pin arrangement of FIG. 4.

FIGS. 4 and 5 illustrate one pin 39 of the nine pins represented in FIG. 2. Each pin 39 is provided with an up pin electromagnetic coil 40 which is wound on a non-magnetic sleeve 41. An electric signal pin connector 42 and a common pin connector 43 is connected with the up pin electromagnetic coil. The pin is also provided with a down pin electromagnetic coil 44 which is connected with the common pin 43 and a connector pin 49 and to a signal connector. The electromagnetic coils 40, 44 attract a metal core 45 which is moved upwardly by the first electromagnetic coil 40 and downwardly by the second electromagnetic coil 44. The metal core 45 when attracted by the first electromagnetic coil 40 will move the braille pin 39 upwardly to an up position. The braille pin will be held in the up position by an electromagnet 46 which is connected with the common conductor 42 and a signal current conductor 47. The braille pin is magnetically attached to a metal bumper 48 which will hold the pin in the up position. The second coil 44 is activated to attract the pin to its downward position. Thus, nine operative pins such as shown in FIGS. 4 and 5 form a braille pad such as represented in FIG. 2. Each of the braille pin groups of nine pins include a braille pad 39', a covering 39" to prevent dirt, etc. from falling onto the pins and a housing 39'" for enclosing the pins.

BRAILLE PIN OPERATION

When electric current is applied to up connector 42 and common connector 43 an electromagnetic field will be produced around the up coil 40 which is wrapped around a non-conductive sleeve 41. This in turn will attract metal core 45 and will ascend braille pin 39 to the up position. Braille pin 39 will be held in the up position by applying electric current to the magnet connector and common connector which will energize electromagnet 46 and the pin will be magnetically attracted to metal bumper 48 which will hold braille pin 39 in the up position.

When electric current is applied to down connector 49 and common connector 43 an electromagnetic field will be produced around the down coil 44 which is wrapped around a non-conductive sleeve 41. This in turn will attract metal core 45 and braille pin 39 will drop to the down position and upon bumper pad 49 to reduce shock and vibration. At this time the electromagnet 46 will not be energized because gravity will hold braille pin 39 in the down position. In a non-gravitational environment, electromagnet 46 will be energized in the down position.

All the parts explained will be housed in a removable rectangular unit 39'", and can be replaced by a snap in, snap out motion. The electronic connector pins 42, 43, 47, 49 will use a modular connector for ease of replacement. The pin pad will be a separate unit consisting of nine holes or six holes per unit to form the braille pad. A rubber protective covering 39" will cover all holes to keep debris and liquids out of the pin motor. When the housing unit is placed in line with other housing units they will form a unit called the braille pad. This braille pad will be used to furnish the changing braille symbols.

FIGS. 6 and 7 represent the electronic signals applied to the first and second coils 40, 44 for moving and holding each pin in its up position and for moving the pin to the down position. As shown in FIG. 6, an electronic signal is applied to the first coil 40 and to the holding coil 46. In FIG. 7 a signal is applied to the second coil 44 and no signal is applied to the holding coil. Therefore, the pin is released by the holding coil.

FIG. 8 is a schematic of the electronic circuit for controlling the operation of the slot machine, the pins, the payout, the vibrator, etc. As shown, a computer 50 is the central control for each of the other operative elements. The braille slot machine can make use of the same computer used in a normal slot machine which is adapted to operate the sensors 51, 52 and 53. The sensors sense the symbols passing the pay line and send signals via the computer. The computer then sends up to nine separate signals for each pad for each reel, one signal to each of the braille pins 13, 15 and 17 of each of the braille pads 12, 14 and 16. Each of the braille pins of each pad will be raised and lowered via the coils 40 and 44 in accordance with the signals created by the different symbols sensed by the sensors. As shown, each of the signals to the braille pad pins pass through a converter. The computer also controls the winning pins 19 for the braille pads 18 via a converter which indicate the winnings. Along with registering the winnings, the computer activates the vibrator when a winning play has been indicated. A BET and PLAY button is provided which controls the play and payout via the computer. The computer operates the slot machine when the play button is operated and pays out the winnings when the pay button is pushed.

OPERATION

The player moves towards the slot machine and feels the slot face 38 of the slot machine and feels raised imprints representing the braille symbols to know what the symbols feel like in braille. The player can choose at this time to feel for the braille win description 3, 4 to understand what symbols 3 are needed on the pay line 9 to retrieve the winning combination. Now the player feels for the braille amount 28 and inserts any amount of coins of that denomination into coin slot 32. Before inserting any coins, all braille pad pins will be down to present a smooth flat surface. At this time the credit pads 20 will register one credit per one coin inserted by means of credit pins 19, this is so the player can verify what amount of coins were inserted into the slot machine at this time. The player will recognize that all the credit pins 19 are numbers due to the preceding permanent raised imprint braille number sign 20. If a coin becomes jammed in the coin slot 32 the player can press the return button, 31 which will also illuminate a help light to receive a Slot Attendant's attention.

After all coins desired to be inserted into the coin slot 32 the player will follow the separation bar 27 down to the bet button 21 which has a braille imprint BET 22 and press this button. After the bet button 22 has been pressed, the reels 5, 6, 7 will spin independently of each other. At this time the braille reel pins 13, 15, 17 will start to move vertically to indicate and correspond with the symbols 8 moving across the pay line 9. The player will place their index finger, or any other finger, on pin pad 12 for the first reel and try to feel the changing of the pins for each symbol 8 moving across pay line 9. After a designated amount of time, reel one 5 will start to rotate slower and then slower so the player can feel the pins representing the different symbols 8 crossing the pay line 9. This will make it easier to feel the symbols 8 crossing pay line 9 on braille pads 12, 14, 16.

Now the player can sense symbol 8 on reel one 5 which has stopped on the pay line 9, this symbol 8 will be indicated on pin pad one 12. Next the player moves their play finger to the right to pin pad two 14 and waits for reel two 6 to stop and reveal what symbol 8 is on pay line 9. Next the player moves their play finger to the right to pin pad three 16 and waits for reel three 7 to stop and reveal what symbol 8 is on pay line 9. Now if the symbols 8 are the same on pay line 9 of the first two reels the player will wait with anticipation for reel three 7 to produce the same symbol 8 to receive a winning combination. This will bring excitement to the player while playing the slot machine. After all reels have stopped rotating, the operator can feel all pin pads to determine the symbols displayed by the reels.

If a win does not occur the player moves their hand to the right of pin pad three 16 and presses the bet button 21 again to play another game. However, if a win does occur the braille pad mount 37 will vibrate by means of the vibrating solenoid 34. The vibration will be caused by the means of a bumping rod with bumper head 36 hitting the thick rubber pad 35 or the use of any other type of vibrating device or win indicating device can be used. At this time the player will move their hand to the credit pads 18 and feel the amount of winnings. After a specified period of time the credit pads 18 will revert back to the amount of credit in the machine including the win. The credit pad will cycle to and from the credit amount and win amount until the bet button 21 is pressed or for a specific time such as for 20 seconds after the specified time the credit pads will revert to the total number of coins deposited and won.

For example, if a player inserts ten coins into the machine, the credit pads will register "10". After the bet button is pressed, the credit pads will register "9" as the reels of the machine are spinning. If a win occurs in the amount of 6, the machine will vibrate and the credit pads will register "6" and cycle between "6" and "15" for the designated time, then after an elapsed period time, the credit pads will continuously register "15" showing total credits in the machine. All wins will be credited to the machine to discourage any theft by other players in the casino who may want to reach into the coin catcher and steal the winnings of a visually impaired person.

When the player is finished playing the slot machine, the player will press the pay button 24 which has in braille PAY 25, to collect all winnings which will fall into the coin catcher at this time. After the pay button has been pushed and the coins have been paid out, all braille pins will revert to a rest position for the next player.

The electronics of the braille slot machine will use the same electronic scheme as of the original slot machine which will be converted into the braille slot machine. All adaptations will conform to using the existing signals generated from the converted slot machine, with minor modifications, to produce all outputs.

The BET button will replace the spin reel button of the existing slot machine and no electronic changes will be needed.

The PAY button will replace the cash out button of the existing slot machine and no electronic changes will be needed.

The COIN IN mechanism will not be changed and minimal programming modifications will be necessary to automatically credit the machine.

The REEL 1, REEL 2, REEL 3 and the sensors for the symbols of each reel will not be changed and will send the same signals to the computer.

The REEL PINS 1, REEL PINS 2 and REEL PINS 3 will use an amplifier to convert the digital signals from the computer into a higher voltage signal to energize the refreshing braille pins.

The PAY PINS 1, PAY PINS 2 and PAY PINS 3 will use an amplifier to convert the digital signals from the computer into a higher voltage signal to energize the refreshing braille pins.

Figure 9:
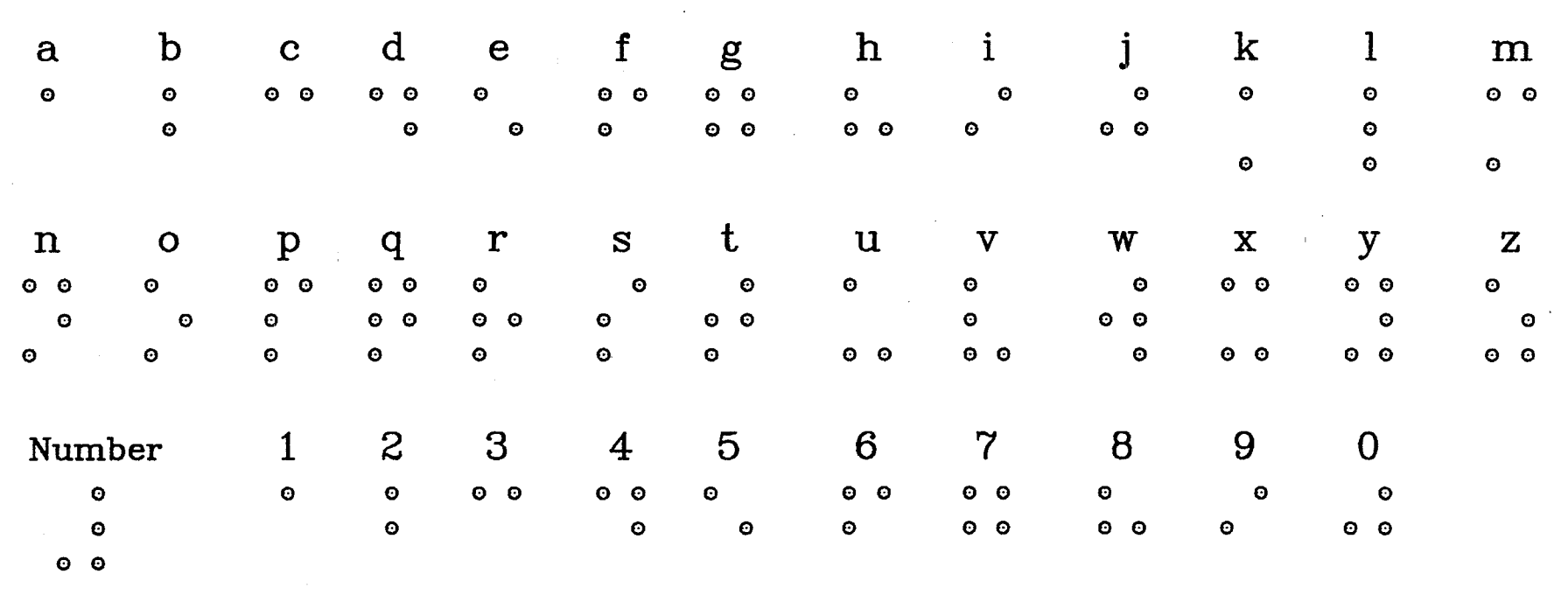

FIG. 9 sets forth the alphabet and the braille pin arrangement for the letters of the alphabet and numbers between 1 and 10, ten being 0. Also the braille pin arrangement for the character "number" is shown. Other braille pin arrangements could be made for a period, comma, colon, semicolon, etc. and these braille pin arrangements could be added to typewriter keys to form a typewriter in which the type could be read by a visually impaired person. In order to display a number, an imprint for the symbol for "number" is used on the left and the braille character for the number is placed on the right of the symbol for "number". The braille characters representing 1–10 (0) use the alphabet representation for a–j, 1 being "a" 2 "b" . . . 10 or (0) is "j". Therefore, the visually impaired person can read numbers as well as letters. Of course the letters of the alphabet will not have the symbol for "number" to the left if it is a letter of the alphabet.

The foregoing relates to preferred exemplary embodiments of the invention, it being understood that other variants and embodiments thereof are possible within the spirit and scope of the invention, the latter being defined by the appended claims.

What is claimed:

1. A braille pad for use by a visually impaired person which represents remotely displayed symbols which comprises a plurality of aligned vertically movable elongated pins, an electrically operated means for vertically raising said pins and aligning an upper end of specific said plurality of elongated pins in a level plane, a digital processor means for sensing said remotely displayed symbols and sending an output signal to said electrically operated means which activates specific elongated pins to raise said specific elongated pink with their upper ends on a level plane that represents said symbol, means for holding said pins in an up position, and means for moving said pins to a down position.

2. A braille pad as set forth in claim 1, in which said braille pad includes at least nine vertically and horizontally aligned elongated pins and each of said at least nine elongated pins are operated vertically independently of each other to form each symbol.

3. A braille pad as set forth in claim 1, in which said electrical means for moving said pins to an up and down position are separate electronic coils.

4. A braille pad as set forth in claim 2, in which said electrical means for moving said pins to an up and down position are separate electronic coils.

5. A braille pad as set forth in claim 3 which includes an electromagnet coil for holding the pins in an up position.

6. A braille pad as set forth in claim 4 which includes an electromagnet coil for holding the pins in an up position.

* * * * *